INVENTOR.
LLOYD JACKSON MOULTON
BY
ATTORNEY

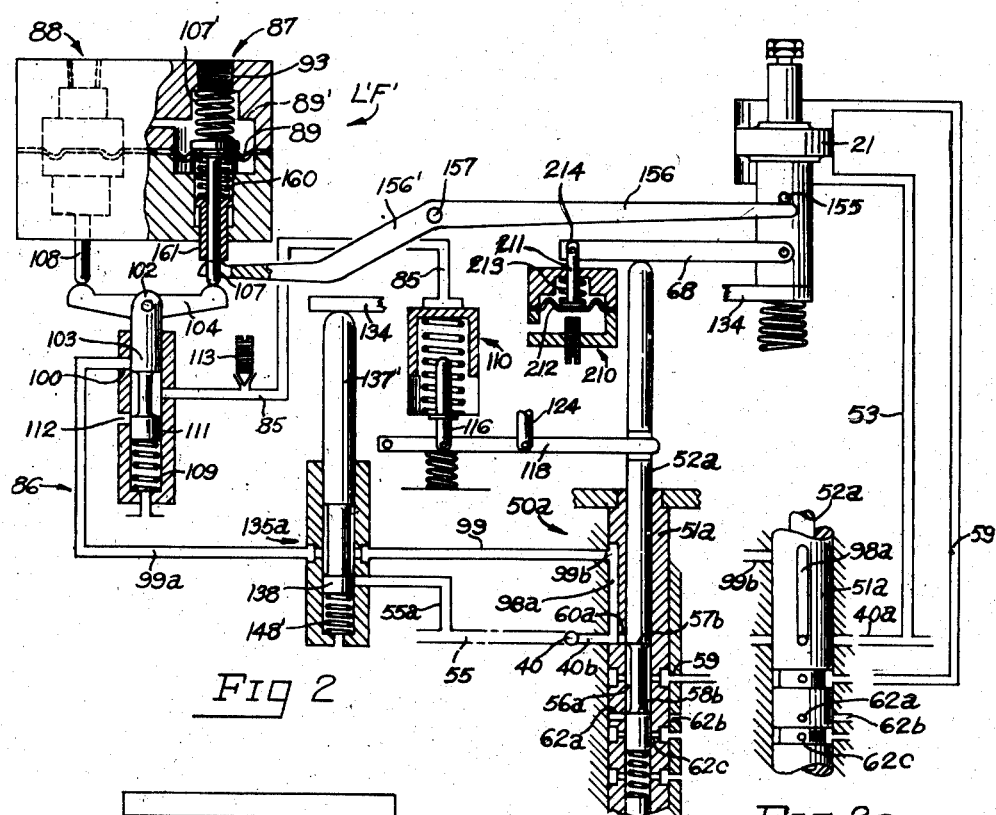
Fig 2
Fig 2a
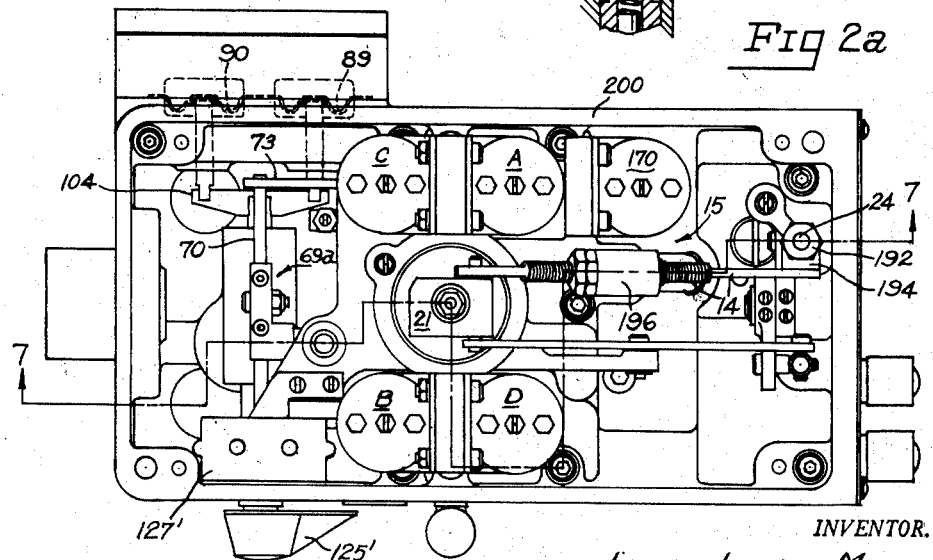
Fig 6

Sept. 1, 1953     L. J. MOULTON     2,650,580
CONTROL MECHANISM

Filed May 20, 1950     4 Sheets-Sheet 4

INVENTOR.
LLOYD JACKSON MOULTON
BY
ATTORNEY

Patented Sept. 1, 1953

2,650,580

UNITED STATES PATENT OFFICE 2,650,580

CONTROL MECHANISM

Lloyd Jackson Moulton, Mentor, Ohio, assignor to The Marquette Metal Products Company, Cleveland, Ohio, a corporation of Ohio Application May 20, 1950, Serial No. 163,115

8 Claims. (Cl. 123—103)

The invention relates to an improved control mechanism for internal combustion engine driven electric generator systems and particularly such systems as are used to drive the traction motors of locomotive vehicles, thereby indicating the general object. The invention provides a form of unitary control mechanism for the internal combustion engine and its generator, so that notwithstanding large variations in traction motor power demand the engine and generator are enabled to operate efficiently within safe load limits and at selectable engine and generator speeds suited to the variations in load or power demand.

The invention, still more specifically, provides an improved means for effecting adjustment of engine speed setting in one or more engine generator system units in accordance with predetermined remotely selected signals or signal combinations, indicating a further object.

A concomitant object is to provide a relatively simple servo control system including two effective interconnected relatively intersecting levers, one containing two input points adjustable as functions of remotely energized signals and the other containing an output point for connection to a servo, the points or the axes of the levers establishing a floating plane, said effective levers being thereby combinable if desired into a single simple lever member spaced points on which can be used as output and relay actuating connections.

Another object and feature of the invention is the provision of an improved automatically acting engine shutdown control, the operation of which is normally responsive to engine lubricating oil system failures but which is restrained from operating for a sufficient period to enable routine starting of the engine (e. g. at idling speed) and which also prevents the engine from continuing to operate in the event the lubricating oil system is not functioning properly a predetermined time after starting.

In connection with detection of engine lubricating oil system failures an object is to provde a mechanism for variably opposing the action of lubricating oil pressure on the detection means with a force which is solely a function of the positioning of a speed setting servo mechanism of the engine governor.

Another object is to provide an improved hydraulically operating, remotely controllable speed setting mechanism for the engine speed governor, which mechanism normally functions to limit the rate at which speed setting adjustment can be effected through remote control while enabling rapid decreased speed adjustments to be effected as required by large changes of speed setting in the decreased speed direction.

Other objects and novel features will be explained in, or will become apparent from the following description of the illustrative embodiments shown in the accompanyng drawings wherein:

Fig. 2 is a schematic view corresponding in part to Fig. 1 showing a modified oil-system-failure-responsive-mechanism.

Fig. 2a is a detail view of a valve mechanism shown in Fig. 2.

Fig. 6 is a plan view of the speed setting and other mechanisms hereof as applied to such hydraulic relay speed governor as shown schematically by Fig. 1.

General purpose

The invention as one aspect thereof provides a system for efficiently and safely controlling the loading adjustments of an internal-combustion-engine-driven electric generator for rail locomotive service, largely through operation of the engine governor in response to speed change detection thereby, in accordance with varying power demands on an electric traction motor or plurality of motors supplied with current by the generator.

Figure 1:
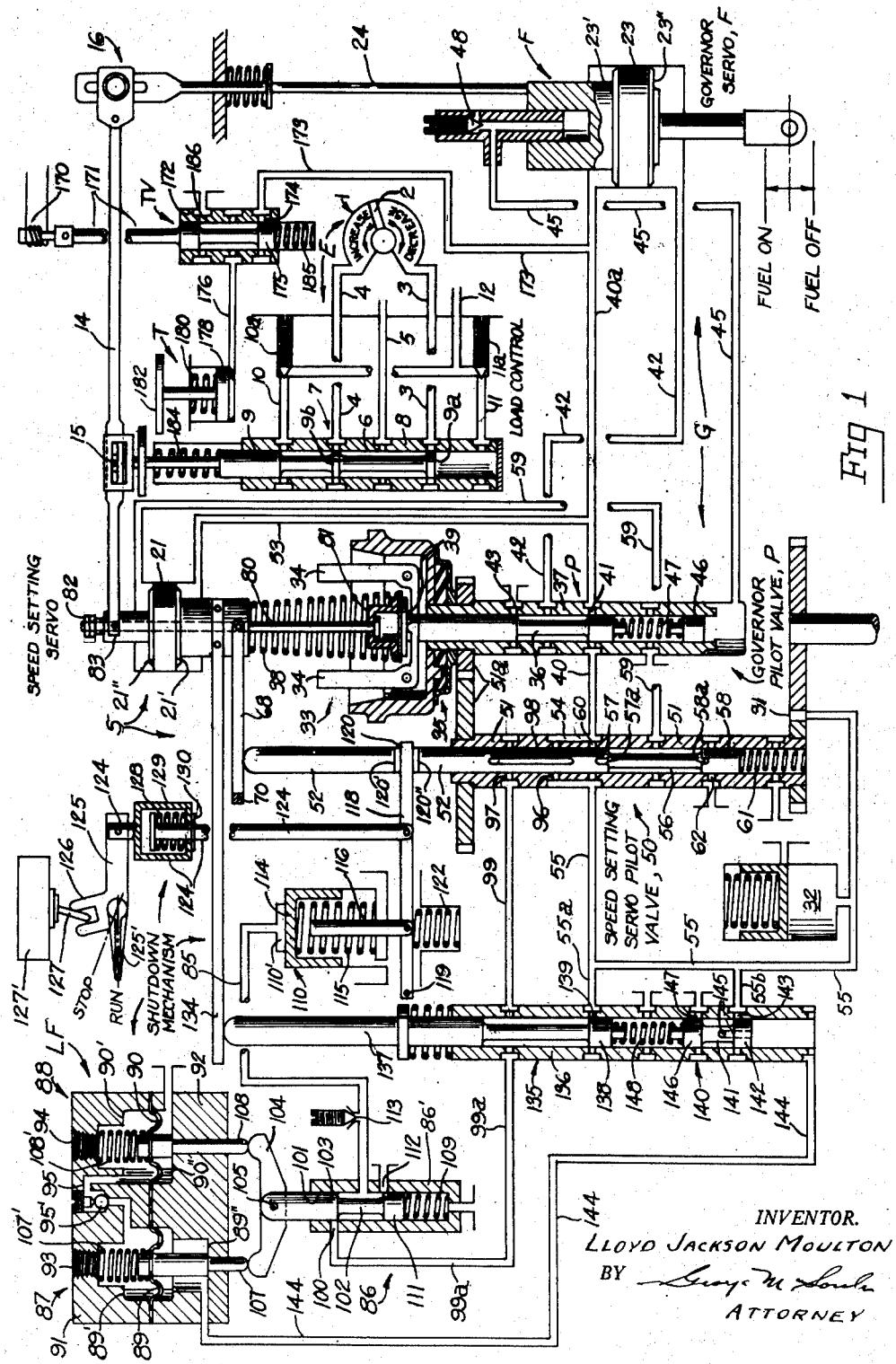
Fig. 1 is a schematic view showing the principal elements of the system and mechanism hereof including a typical hydraulic relay governor for the engine, electrical load control hydraulic mechanism coupled therewith and one form of engine-lubrication-oil-system-failure responsive shutdown means for the engine.

The engine governor G, as schematically shown in Fig. 1, is of the hydraulic relay type arranged for isochronous operation, and has a fuel regulating servo piston mechanism F, pilot valve P and a speed setting means including remotely controllable actuator mechanism (see DF Fig. 3) for a hydraulically operated speed setting servo mechanism S, all more fully described later. The various mechanisms of Fig. 1 are shown in positions occupied when the engine is in operation at idle or low speed. The various fluid operated mechanisms are shown, for convenience only, as having vertical axes.

Electrical load control

In Fig. 1, at upper right, a well known type of hydraulic mechanism is indicated at E for adjusting the electrical loading or load carrying capacity of the generator (not shown) as by varying its field excitation resistance. The vane 2 of reversible load control motor 1 is moved as indicated to increase generator excitation and thereby increase its electrical loading when operating fluid is admitted to the motor 1 through line 3 and removed therefrom through line 4; and the opposite effect follows reverse routing of fluid and reverse indicated movement of the vane (decreased excitation, decreased loading).

Operating fluid for the electrical load control motor 1 may conveniently be supplied from the lubricating oil system of the engine (not shown) as through a line 5 which leads to an inlet chamber 6 of a load control valve 7 having a multi-ported sleeve 8 and axially shiftable plunger 9 with lands 9a and 9b normally closing outlet/inlet ports connected respectively with the motor fluid supply lines 3 and 4. The rate of operation of vane motor 1 may be controlled for maximum acceleration consistent with equipment safety by throttling the exhaust fluid from the vane motor as by individually adjustable needle valves 10a and 11a in exhaust fluid lines 10 and 11 connected with respective end portions of the valve sleeve 8 and vented to an atmospheric pressure or engine lubricating oil sump as at 12 between the needle valves.

The load control valve 7 is actuated by an intermediate portion of a floating lever 14 through an adjustable connection 15 therewith. Said lever is connected at one end to the speed setting servo piston 21 of mechanism S and at the other end, adjustably at 16 to governor servo piston tail rod 24. Valve 7 is normally maintained in the illustrated neutral position by the floating lever 14. For a given speed setting, a change of generator load causes valving motion of the load control valve by normal governor fuel regulating servo motion. The load control valve 7 is so connected to the load control vane motor 1 that action of the motor is such as to counteract the generator load change that has taken place. This vane motor action will continue until, through normal governor action, the governor fuel regulating servo F has returned the load control valve to its neutral position.

In event of a change in speed setting servo adjustment (mechanism S) valving action of the load control valve 7 will cause through the load control motor 1, a change of generator loading in the same direction as the speed change until, through normal action of the governor fuel regulating servo F, the load control valve is returned to its neutral position. Thus for each position of the speed setting servo with a neutral load control valve position, there is a corresponding governor fuel regulating servo position.

Hydraulic relay governor

Figure 7:
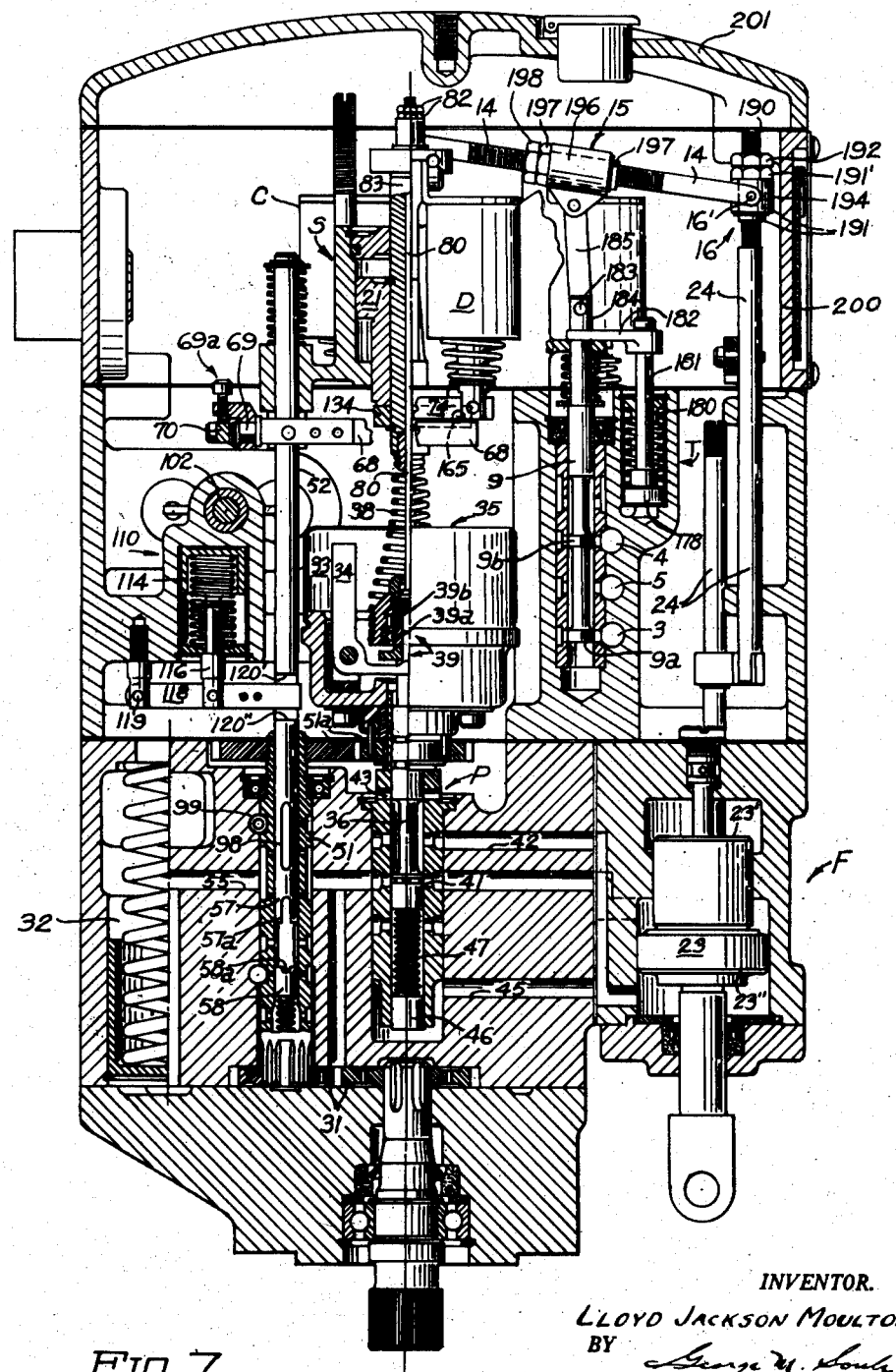
Fig. 7 is a sectional view of the governor and associated mechanisms.

The engine fuel regulating governor G as will be more clearly apparent from Fig. 7 may be considered as constituting the basic environmental portion of subject system, partly in that the governor assembly, as is usual, has its own hydraulic pressure source (e. g. pump 31 and spring-loaded accumulator 32, of Fig. 1) which source serves all other hydraulically acting mechanisms not yet described and may also serve the electrical load control motor 1.

The governor G has a speed sensitive mechanism 33 including flyballs 34 on a rotary ballhead assembly 35 driven as will be explained, the flyballs acting on the plunger 36 of pilot valve P in non-rotating pilot valve sleeve 37. Outward action of the flyballs is opposed by a speeder spring 38 connected to the pilot valve plunger 36 through a thrust plate assembly 39.

For minimization of static friction in the essential elements of the governor pilot valve and flyballs turn the valve plunger 36 in its sleeve 37 through the intermediary of the assembly 39 substantially as in Kalin Patent 2,219,229, issued October 22, 1940. An antifriction bearing 39a, Fig. 7, is interposed between thrust plate assembly 39 and a non-rotating collar 39b connected to the lower end of the speeder spring as in said patent. Speed setting servo piston 21 of mechanism S adjusts the speeder spring 38 to set the engine speed by a succession of direct actions on said spring—raising of the piston resulting in decreased engine speed settings and lowering resulting in increased speed settings.

Hydraulic fluid from the pump and accumulator system (hereinafter governor pressure oil or governor oil) is continually admitted to the top (smaller area 23') of the governor servo or power piston 23 through line 40—portion 40a thereof. In neutral or equilibrium position of the governor pilot valve plunger 36 oil is trapped in contact with the lower larger side 23" of the power piston. "Fuel on" movement of the power piston results from downward pilot valve plunger movement admitting governor oil through ports 41 of pilot valve sleeve 37 and line 42 to the larger piston side 23"; and "Fuel off" movement results from upward movement of said valve plunger, thereby spilling trapped oil from line 42 to governor sump through ports 43 of pilot valve sleeve 37.

Feedback from governor power piston 23 to the governor pilot valve P is shown in the form of a hydraulic compensation system arranged for isochronous governor operation. The power piston 23 pumps compensation oil through line 45 to and from the working chamber of a receiving compensation piston 46 attached to the pilot valve plunger 36 by a coil spring 47; and an adjustable leak-off for compensation oil is provided in the system at 48.

Speed setting servo system

The governor speed setting servo mechanism S includes a speed setting servo pilot valve mechanism 50 shown in Fig. 1 at the left of the governor pilot valve. Valve mechanism 50 comprises a valve sleeve 51 and valve plunger 52 slidable therein. A relatively smaller (lower) area 21' of the speed setting servo piston 21 is continually exposed to governor pressure oil through a line 53 connected with line portion 40a of line 40. Line 40 is continually connected with accumulator output line 55 through a cavity 54 around valve sleeve 51. A valve chamber 56 within the sleeve 51 (defined in part by relatively upper and lower effective lands 57 and 58 of the valve plunger) is continually connected, via line 59, with the upper relatively larger effective area 21'' of the piston 21.

The speed setting servo pilot valve mechanism 50 is shown in a neutral position and it will be observed that upward movement of the plunger 52 can cause a pair of slots 57a of land 57 (one slot shown) to open ports 60 and permit governor pressure oil from line 40 to be supplied through line 59 to the larger (top) side of speed setting servo piston 21 and cause downward movement of the piston. Similarly downward movement of the pilot valve plunger 52 (opposing return spring 61 below the plunger) enables paired slots 58a in land 58 (one slot shown) to open sump-connected ports 62—resulting in spilling oil trapped in line 59—thereby to cause or enable upward movement of speed setting servo piston 21 through the continually effective governor oil pressure on lower piston face 21'.

Primarily to minimize static-friction-force-restraint on valving relative movement of speed setting pilot valve elements 51, 52 and, concomitantly, to control the rate of movement of the speed setting servo piston 21 and of a hydraulically acting shutdown mechanism acting through the valve mechanism 50 while enabling use of undiminished governor oil pressure (mechanism later explained) the pilot valve sleeve 51 is continually rotated during governor operation. The sleeve 51 for that purpose is (e. g.) keyed to one of the two gears which form the principal elements of the governor oil pump 31. The sleeve 51, in turn, through a set of mating gears 51a at the top of the valve sleeve, drives the ball head 35, and therethrough the governor pilot valve plunger 36. Rotation of the sleeve 51 can effect fluid flow rate control in a variety of different ways two of which are shown (Fig. 1 and Figs. 2, 2a).

The speed setting servo rate control according to Fig. 1 (assuming rotation of the pilot valve sleeve 51 and that plunger 52 is suitably held against rotation) is illustrated by supposing that plunger 52 is raised from the illustrated neutral position (for increased speed setting by application of governor pressure oil to upper chamber of servo piston 21), whereupon it is apparent that the slots 57a of land 57 can only register with the ports 60 on each partial rotation of the sleeve, causing interrupted admission or spurtwise flow of governor oil into line 59. Similarly, when the valve plunger 52 is lowered a limited amount (for decreased speed setting) slots 58a of land 58 interruptedly align with the spill ports 62 for spurtwise flow through the valve.

If more than the limited lowering movement of the speed setting servo pilot valve plunger 52 takes place, then the entire top edge of land 58 controls spill ports 62, resulting in rapid travel of the speed setting servo piston toward the minimum speed setting and shutdown-effecting positions. Shutdown action of said piston 21 (explained later) is through the intermediary of the governor pilot valve P.

*Speed setting servo system actuator*

Figure 3:
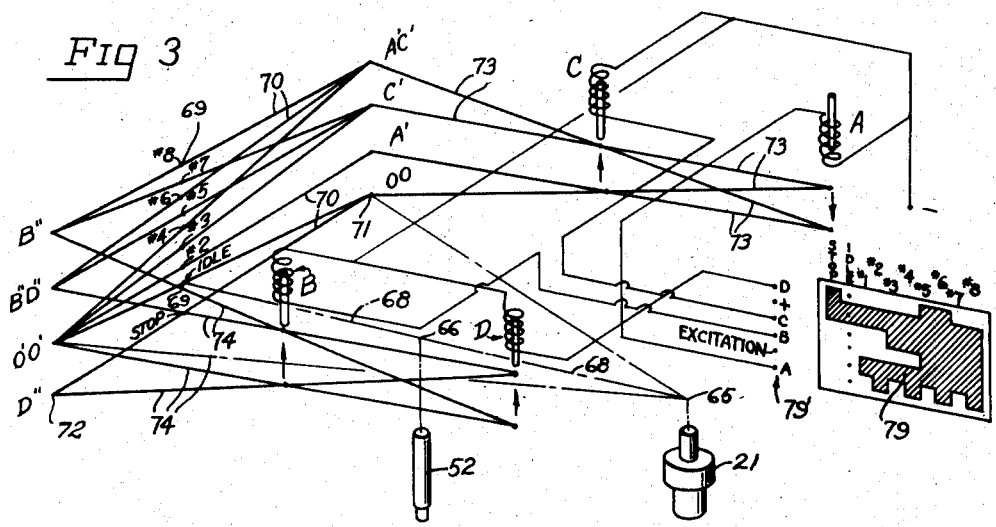
Fig. 3 is a diagrammatic perspective view showing the positionng system hereof by whch equal movements of a plurality of solenoid armatures may be selectively used and be permutated to produce the desired number of positions of a single output servo element of the system.
Figure 4:
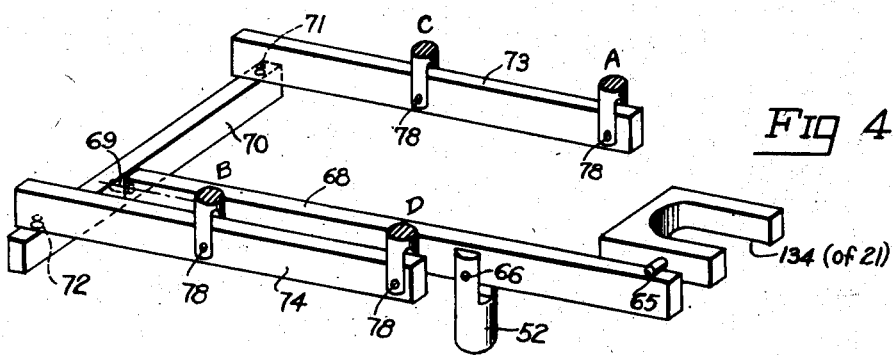
Fig. 4 is a perspective view of one physical arrangement of parts essentially according to Fig. 3.
Figure 5:
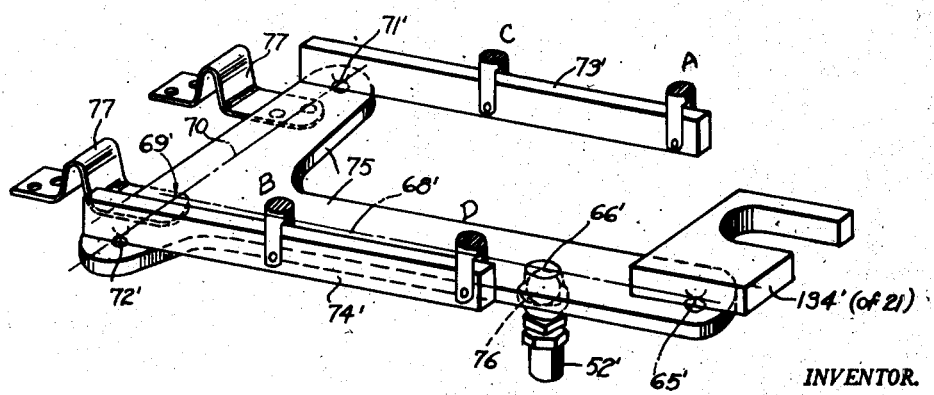
Fig. 5 is a similar view showing a somewhat different arrangement and design of parts.

Speed setting servo pistons 21 (Figs. 1, 3, 4, and 5) is arranged to be actuated by the above described pilot valve mechanism 50 through a remote-control signal-responsive differential and feedback lever system DF, Fig. 3, two exemplary forms of which are shown in Figs. 4 and 5. The utilized positions of the effective levers of both arrangements in relation to permutatable signal-receiving elements (e. g. solenoid-lever combinations) are diagrammatically shown in Fig. 3 and will be described later.

In Fig. 4 (illustrating essentially the physical arrangement according to Figs. 6 and 7 but not in scale therewith) the servo mechanism S is represented by servo piston 21 and relay valve plunger 52 as pivotally connected at respective spaced points 65 and 66 along the effective longitudinal axis of a floating lever 68 one end of which is pivotally connected at point 69 with a differential lever 70. Point 65 is the output point of the system, and the input points are represented at 71 and 72 which are preferably at the opposite ends of the differential lever 70. It will be apparent that the output point 65 in conjunction with the input points 71, 72 (likewise the longitudinal axes of the effective levers) determine a floating plane.

Signal receiving members are shown in the form of solenoid-operated generally parallel levers 73 and 74 one end (e. g.) of each of which is connected to a respective end (points 71 and 72) of the differential lever 70 as by clevis-like joint elements (e. g. pins and elongated slots) with suitable provision for vertical adjustment relative to the armature of the solenoids, described later. The floating lever 68 may also have provision for vertical adjustment of point 66 with respect to the relay valve plunger. In Fig. 4 a pivotal connection at point 69 between differential lever 70 and floating lever 68 is indicated as a line bearing (like a hinge) but no provisions for relative pivoting between levers 68 and 70 is actually necessary as will be explained.

In Fig. 5 approximately the essential arrangement of Fig. 4 is represented by the combining of the floating lever 68 and differential lever 70 into a single member shown in the form of a substantially rigid universally floating plate 75, e. g. sheet metal stamping, the effective lever axes and essential connection points being generally indicated by the same characters as used in Fig. 4 but primed. Point 69' does not act as a pivot; and, in order to allow the necessary universal floating movement of the plate 75, a spherical joint 76 is substituted for the assumed hinge joint connection of lever 68 to the relay valve element 52 of the servo system. The connection at 65' between lever 68 and the servo piston 21 is a suitable "point" bearing. The plate 75 can be maintained in freely operating position and the necessary bearing elements held in working contact by provision of combined action (e. g. looped leaf) springs 77 attached to the plate and some fixed part of the governor-speed-setting mechanism housing or supporting bracket portion thereof.

In Fig. 3 the remotely-controllable signal receivers are more or less diagrammatically represented as four solenoids A, B, C, and D, the armatures of which are assumed to be appropriately connected to the levers 73 and 74 for push or push-pull operation thereof. The number of solenoids is already established in practice and also their manner of control (order and permutation of energization and deenergization). The solenoid armatures normally have equal length strokes.

*Signal permutation*

Subject system uses permutation of the four equal strokes of the solenoids A, B, C, and D to effect all the necessary incremental positioning of the speed setting servo piston 21 as desired for diesel-electric locomotive engine control at the present time. The clevis type connections at point 78 in Fig. 4 between the armatures of solenoids B, C, and D and the levers 73 or 74 are partly for holding the levers in proper working planes, and those armatures pull upwardly on the levers at the connection points against the resistance of suitable downwardly acting springs (not shown) associated with the solenoids. Solenoid A acts downwardly when energized (against an opposing spring, not shown), through a clevis 78 or any other suitable connection (e. g. "point" bearing) against the lever 73. The armature, lever connections, and positioning springs serve alternately as fulcrums as already known to the art.

Selective energization of the solenoids is effected by operation of an electrically conductive contacter drum element or plate such as represented at 79, Fig. 3 profiled to establish and disestablish current in respect to the solenoids A, B, C and D in predetermined combination sequence in accordance with relative positions of element 79 and the row of solenoid-etc.-connected contacts 79' as well understood in the electric controller art. The positions for engine shutdown ("stop"), for starting ("idle") and the various steps for increased speed settings: #2, #3, #4, etc., (#1 being for electrical load control purposes only), are indicated on Fig. 2, adjacent the drum element 79. Shifting of said element through "stop"-contacting position and the various indicated control steps energizes the solenoids in the following order: D; none; None; A; C; AC; BDC; ABCD; BC; and ABC. In indicated step #1 the generator excitation is energized and remains energized for all the subsequent steps.

By energizing and deenergizing the four solenoids A, B, C, and D all possible input motion subdivisions (three subdivisions for each pair of solenoids) are established. When both solenoids A and C are deenergized the servo control or differential lever input point position of lever 73 is at 00 Fig. 3. Similarly solenoid A "on" and C "off" results in servo control system input point position A': with A "off" and C "on": input point position C' results; and with both solenoids A and C "on" input point position A' C'.

Similarly, combinations of action and inaction on part of solenoids B and D result in the indicated input point positions 0'0', B", D" and B"D" at the opposite end of the differential lever 70.

The resulting combinations of input point subdivisions operate through the differential lever 70 to provide a plurality of net input subdivisions at point 69 of the effective levers 68, 70. Nine equal net input subdivisions may be obtained by location of net input point 69 at one third of the distance along the differential lever between the input points 71 and 72 and by selecting appropriate combinations of input subdivisions. Seven equal net input subdivisions are used between steps #1 and #8, two of such obtainable subdivisions being used for engine shutdown.

In Fig. 3 it may be observed that the amplification ratio of the servo system is determined by the ratio of effective feedback lever length elements 66—65:66—69, the embodiment thereby resulting in a reversely acting feedback lever. If a direct acting feedback lever were to be used the relay actuating point 66 would be located along an extension of the effective feedback lever beyond point 69; but the ratio of the distances 66—65:66—69 would still determine the amplifying ratio.

Signal actuated valving

It will be apparent from the above that as the control drum or contacter element 79 is moved, as from "idle" through the various speed setting increment steps #2, #3, etc., the speed setting servo piston 21, notwithstanding the rapid action of the solenoids, will be moved gradually through the corresponding positions due to the low rate of fluid movement (interrupted, spurtwise flow) through the speed setting servo pilot valve 50 via the slots 57a in the plunger land 57. It will also be apparent that in the decreased speed setting direction of operation of the pilot valve 50 slow, stepped speed adjustments result in low rate servo movement by reason of the flow-interrupting action of the lower land slots 58a. If the plunger 52 is moved downwardly far enough to uncover the ports 62 by the entire upper edge of plunger land 58 non-interrupted, hence more rapid, flow of trapped fluid from above the speed setting servo piston 21 occurs. Such rapid flow may result from rapid control drum operation in the reduced-speed-setting direction or through the agency of several engine stopping devices as will be described. The engineer or operator cannot by rapid control drum operation vary the rate at which increased speed setting operation of servo piston 21 will occur.

Speed setting mechanism adjustment

Because it is a difficult matter to manufacture speeder springs (e. g. 38 Fig. 1) so that springs of different, supposedly identical, governors are exactly alike an adjustment of the idle speed setting position of servo piston 21 may be accomplished by variations in the equilibrium or neutral position of speed setting pilot valve 50 as determined by action of the various solenoids on the effective lever system of Figs. 3, 4, and 5.

For example, the stem of the pilot valve plunger, as in Fig. 5, may be operatively lengthened or shortened by suitable means as suggested and locked in position after the idle setting of piston 21 is found to obtain the desired idling speed of the engine. An operative equivalent of the adjustment just described, in the case of Fig. 4, can conveniently be accomplished by making the two portions 69—71 and 69—72 as separate sections hinged together at point 69 for relative adjustment about the hinge axis (see adjustment device 69a, Fig. 7) thereby enabling movement of all the net input positions up or down without changing the total travel represented by the net input subdivisions.

In addition or alternatively, in order accurately to adjust the speeder spring for predetermined governed speeds, having in mind that very minute differences in stroke lengths on part of the various solenoids armatures (strokes being short) may be reflected in important inequalities in speed setting step increments of the servo piston 21, the solenoid armatures are made individually adjustable (adjustment means not shown, being of known construction) at one end or the other of the stroke of each. Adjustment of the beginning points only of respective solenoid strokes is usually sufficient in order to obtain the necessary servo step increments for accurate speed setting.

Engine lubrication system failure shutdown (automatic shutdown)

Subject system automatically effects shutting down of the engine in event (a) the engine lubricating oil system output pressure drops to a predetermined, i. e. dangerously low, value in relation to engine speed and (b) the lubricating oil pump intake absolute pressure drops to a predetermined abnormally low value (excessive pump suction). As previously indicated, however, the lubricating oil failure responsive shutdown operation needs to be delayed in order to permit routine starting; and the engineer or operator should be enabled to re-start the engine after shutdown and operate it at low speed for brief periods such as will enable study of the cause of lubricating oil system failures.

Engine shutdown (Fig. 1) can conveniently be accomplished through hydraulic adjustment of the speed setting servo piston 21 to a top position (not shown) whereby the governor pilot valve plunger 36 is physically raised and maintained in a position such as will cause the pressure of trapped oil below the fuel adjusting power piston 23 to be dissipated quickly. A suitable means for so accomplishing shutdown is the provision of a shutdown rod such as shown at 80, Figs. 1 and 7 extending freely through an axial bore of the piston 21, through the speeder spring 38 and to the non-rotating, spring-supporting collar 39b, the bearing 39a thereby providing a suitable swivel connection between the shutdown rod 80 and the valve plunger. The upper end of the shutdown rod has an axially adjustable abutment 82 (pair of threaded nuts, Fig. 7) positioned for engagement with the upper stem portion 83 of the piston 21 which, when that piston is caused to move upwardly a predetermined distance above its "idle" speed setting position, pulls upwardly on the governor pilot valve plunger 36 through rod 80 causing cutting off of engine fuel through already described means.

Engine shutdown control in event of engine lubrication oil system failure (and when "hand shutdown" operation at the governor is necessitated for any reason) is accomplished by long stroke downward movement of the speed setting servo relay valve plunger 52.

The oil-system-failure-responsive apparatus, indicated generally at LF, upper left Fig. 1 (L'F' in Fig. 2), controls a valve 86 which diverts governor oil from accumulator-connected line 55 as through lines 99, 99a, described later, and line 85 to the working chamber 110' of an oil-failure-shutdown motive unit 110 which, through a lever 118 and lost motion connection 120 (also described later) is capable of depressing the speed setting servo relay valve plunger 52 a considerable distance (i. e. sufficient to uncover pilot valve spill ports 62 by the entire upper end of plunger land 58).

*Time delay (of shutdown) for engine starting and testing*

Operating fluid for shutdown motive unit 110 is routed from governor-accumulator-connected line 55 to lubricating-system-failure responsive valve 86 through the annular chamber 54 around the speed setting servo pilot valve sleeve 51; ports 96 and 97 thereof which intermittently register with elongated axial slot 98 (or grooves) in the plunger 52 as the sleeve 51 rotates, and a line having continually interconnected portions 99 and 99a, thereby supplied with oil spurtwise. Portion 99 is continually open to valve sleeve ports 97, and portion 99a leads to a port 100 of valve 86 which port is normally closed. The rotating relay valve sleeve 51 thus maintains one source of supply of operating pressure for shutdown motive unit 110 which, upon actuation of valve 86, flows to said unit through line 85 at a definitely controlled relatively slow rate. Such slow rate supply of fluid enables the engine to be started, but only at idle or low speed setting, by delaying shutdown action for a period such as required for normal engine lubricating oil pressure to become established. The rate of action of shutdown motive unit 110 can be further varied by an adjustable leak-off valve 113 situated between valve 86 and said unit (shown in line 85).

For speed settings other than low or idle a spurtwise-flow-circumventing or by-pass valve 135 (lower left described later) is operated by the speed setting servo mechanism S to supply the line 99a leading to valve 86 continuously with governor oil for more rapid shutdown action upon functioning of the valve 86 to open line 99a to line 85.

*Engine lubricating system failure detector*

Lubricating system failure responsive mechanism LF, in addition to valve 86, comprises two pressure detecting motive units 87 and 88 embodying respective elastic diaphragm members 89 and 90 in sealed chambers 89', 89'' and 90', 90'' formed between separable casing portions 91 and 92. Chamber portion 89' is connected to the pressure side of the engine lubrication system at opening 93, and chamber portion 90' is similarly connected to the suction side of said system at 94. The engine shutdown operation is accomplished through actuation of the valve 86 by whichever one of the devices 87 or 88 detects a failure or undesired condition of the lubricating system.

In order that the lubricating oil pressure as imposed on diaphragm 89 may vary with engine speed without initiating shutdown, and as a means of obtaining shutdown initiating force, a counterbalancing or opposing pressure varying with engine speed (actually with speed setting) is maintained in diaphragm chamber 89'' by, for example, device 140 comprising a spool-like plug 142 slidable in sleeve 136 and a control spring 148 operative on the plug to maintain adjusted pressure in diaphragm chamber 89'' through a line 144. Pressure maintained in said chamber insures operation of valve 86, when lubricating oil pressure fails, in unblocking port 100 leading to shutdown motive unit 110. Device 140 will be more fully described under the heading "Varied Opposition to Lubricating Oil Pressure."

Port 100 or valve 86 is formed in a suitable sleeve 86' defining the valve chamber, and said port is normally blocked by land 103 of valve plunger 102 arranged for operation interchangeably by detector units 87 and 88 through the intermediary of a lever 104 pivoted at 105 to one end of the plunger 102 and push rods 107 and 108 connected to respective diaphragms 89 and 90 and bearing on respective ends of said lever.

The diaphragms 89 and 90 have coil springs 107' and 108' acting through the diaphragm center supports on respective pushrods 107 and 108. Coil spring 107' acts in a direction to maintain the pushrod 107 of diaphragm 89 against a fixed stop, as does adequate lubricating oil pressure on that diaphragm. A spring 109 acts on the valve plunger 102 of valve 86 in a direction to cause the plunger 102 and its operating lever to follow the pushrods 107 and 108 and unblock port 100 when either or both pushrods moves or move in a direction indicating a lubricating oil system failure. Spring 108' of the excessivesuction-responsive unit 88 is designed to resist movement of diaphragm 90 out of its normal (illustrated) position except when excessively high suction occurs in chamber portion 90'. Spring 108' enables the pushrod 108 to act as a fulcrum for the lever 104 when the diaphragm 89 is moved (during the described low lubricating oil pressure conditions) to initiate the engine shutdown operation through action of valve 86 and motive unit 110. Similar fulcrum action of the pushrod 107, when diaphragm 90 moves to initiate shutdown, is enabled by pressure of lubricating oil against the diaphragm 89 assisted by spring 107'. Simultaneous action of both diaphragms also initiates shutdown assuming appropriate pressure in line 144 as partially described assisted by spring 109.

Passage 95 in diaphragm casing section 91 connecting the lubricating oil system fitting-receiving holes 93 and 94, is (during operation of subject system) closed by a valve plug 95'. The passage 95 (with valve 95' open) permits the lubricating oil to be introduced into the chamber 89' and bled into chamber 95 along with any air that might otherwise be trapped in contact with diaphragm 89.

Assuming action of either or both diaphragms 89 and 90 as described above, resulting in unblocking of port 100 of valve 86 by valve plunger land 103, the movement of the plunger by reason of its land 111 closes a sump-connected outlet or spill port 112 in bore 101. Assuming further that the engine is operating at idle speed, governor oil from line 99a at a controlled or relatively slow rate is forced to flow in the line 85 and begins to move piston 114 of motive unit 110 against the resistance of a piston return spring 115 in a direction to cause the piston to depress an upstanding pushrod 116 connected to the shutdown control lever 118.

The lever 118 has a fixed fulcrum 119 at one end and the opposite end of the lever, as previously indicated, has a two-way lost motion connection 120 with the stem of speed setting servo relay valve plunger 52. The connection 120 of the lever, incidentally, is designed to prevent the valve plunger 52 from turning with its continually rotating valve sleeve 51. Lever 118 has a positioning spring 122, which may be associated with the pushrod 116, to return the lever to its non-operating position clear of the lost motion abutment surfaces 120' and 120" of the pilot valve plunger so that movement of said plunger by the signal-receiving electrical mechanism will be substantially unrestricted.

The normal distance between the pushrod 116 of shutdown motive unit 110 and its piston 114 is such that the spurtwise flow in line 99 requires a substantial period of time (which may be variably adjusted by valve 113 as already mentioned) in order to accomplish engine shutdown after initiation of that operation by a diaphragm unit 87 and/or 88.

It will be recalled that downward operation of the speed setting servo pilot valve plunger 52 for more than a small part of its possible movement results in fast upward operation of speed setting servo piston 21 to the top of its possible stroke and operation of engine shutdown rod 89.

*Varied opposition to lubricating oil pressure*

As already mentioned, the time delay (prior to shutdown) afforded by spurtwise supply of governor oil through line 99 is made available only in the idle speed setting of the servo piston 21. Said piston has a rigid arm 134 thereon arranged to control the position of the spurt-circumventing or by-pass valve 135, shown in Fig. 1 as comprising an upwardly spring biased valve plunger 137 in ported sleeve 136 already partially described. The plunger 137 has a land 138 which in the idle or low speed positions of the speed setting servo piston blocks ports 139 connected to governor oil pressure (line 55a). In all high speed settings the plunger 137 is depressed by piston-connected part 134 to uncover ports 139 so that governor oil can be caused to flow steadily through line portion 99a etc., to the automatic shutdown piston unit 110 as soon as plunger 102 of valve 86 moves to unblock feed port 100.

For each engine speed there is a particular minimum safe lubricating oil pressure, the minimum increasing with engine speed. Therefore, the action of the engine-lubrication-system-failure responsive shutdown mechanism is modified by the speed setting servo mechanism throughout the range of speed setting steps from #2 to #8.

The valve sleeve 136 of valve 135 also serves as the body of the pressure control device 140 action of which was earlier outlined and which appropriately modifies or variably opposes the action of the engine lubricating oil on the diaphragm 89 in accordance with engine speed. The spool-like floating plug or plunger 141 of said device 140 has a lower land 142 controlling admission of governor oil from line 55b at sleeve ports 143 into the line 144 communicating with the bore of the sleeve 136 below the floating plug through passages 145 therein and around the neck of the plug. The line 144 as already stated leads to diaphragm chamber 89" of lubricating-oil-pressure-responsive motive unit 87. The top land 146 of the floating plug normally closes spill ports 147 leading to governor sump and the plug is biased downwardly by a coil spring 148 which, incidentally, is connected to the lower end of spurt-circumventing or by-pass valve plunger 137 and to the floating plug by coils of the spring acting as screw threads. The space enclosing the spring 148 is suitably vented to sump.

By the above described arrangement governor oil is permitted to occupy the line 144 and diaphragm chamber 89" at pressure determined by the compressive resistance of the spring 148 which opposes upward (port-closing) movement of the floating plug through accumulating pressure therebelow acting on its lower end. As the valve plunger 137 is lowered by the speed setting servo piston 21, in calling for increased engine speed, increasing pressure in line 144 is required hydrostatically to close ports 143. Therefore the pressure in line 144, as required to modify the described automatic shutdown action, is solely a function of engine speed setting. The action of the mechanism 140 is not affected by any other part of subject system, which is also true of the modified arrangement (Fig. 2) to be described later.

*Hand shutdown and alarm switch*

The lever 118, engine shutdown action of which was described above, has a linkage including a two part rod 124 secured to it for operation by a lever 125 having a manually accessible handle portion 125' externally of the governor case. The lever 125 as shown is in the nature of a bell-crank having an arm 126 connected to the actuator arm 127 of an electric spring toggle switch 127' by which an alarm circuit (not shown) is operated concurrently with automatic engine shutdown due to lubricating oil system failure. The toggle spring latches the lever 125 in the indicated "stop" position as well as its "run" position. The switch 127' is operated in response to shutdown action of shutdown motive unit 110 through the intermediary of a yielding portion of the linkage which portion, as shown, comprises a spring 128 in a housing 129 forming the upper part of rod 124.

The housing 129, through a shoulder 130 on rod 124 is held by spring 128 in operating abutment with the lower portion of the rod positively to transfer hand shutdown manipulation of the handle portion 125' of lever 125 to the lever 118. The spring 128 enables the lubricating-oil-system-failure-responsive motive unit 110 to override any attempt by the operator, through manipulation of handle 125', to maintain the engine in operation indefinitely when the lubrication system is not functioning properly.

When the speed setting servo piston 21, as a result of either automatic (lubricating oil system failure) or hand shutdown operation (lever 125) moves to its shutdown-rod-lifting position said piston 21, through its arm 134, allows spurt circumventing valve plunger 137 to lift and with it the spool-like plug 141 of the lubricating-oil-pressure-opposing mechanism 140 by relieving the force of its spring 148. Pressure in the line 144 leading to diaphragm chamber 89″ thereby immediately falls to negligible value (spilled at plug sleeve ports 147) as the hand shutdown rod 124 and the lever 118 become latched by switch arm 127 in shutdown position. Thereupon, in the absence of lubricating oil pressure, the spring 107 which acts upon the lubricating oil pressure side of the diaphragm 89 returns the valve plunger 102 of valve 86 to its initial illustrated position in which oil that has accumulated in shutdown piston unit 110 can be spilled through vent port 112, whereby to enable the engine to be started up again.

After the described automatic shutdown or hand shutdown operation has been accomplished the handle 125 must be returned to its "run" position in order to free the speed setting pilot valve plunger 52 from restraint by shutdown control lever 118 at its lost motion connection 120.

If it is desired to eliminate the fluid spilling action of valve 86 at port 112 the spring 107' of mechanism LF can be omitted, in which case the needle valve 113 or equivalent leakoff means will determine a period of rest, after automatic shutdown, before the engine can be restarted.

*Modified lubricating oil system failure responsive mechanism*

As shown in Fig. 2 the speed setting servo piston 21 is arranged mechanically to provide for adjusting, in accordance with engine speed, the critical operating point at which low lubricating oil pressure causes engine shutdown through action of motive unit 110. As shown in Fig. 2 the speed setting servo piston 21 has an operating abutment 155 for a lever 156 pivoted at 157 which lever acts through an arm 156' thereof to adjust a compression spring 160 bearing against the diaphragm 89 which is exposed to lubricating oil pressure and in a direction opposite the action of such pressure. The lever arm 156' acts against a tubular distance piece 161 forming the support for one end of the spring 160. The effective force of the spring in the direction of shutdown-initiating movement of the diaphragm 89 is thereby increased with engine speed—i. e. the same ultimate effect as obtained by the hydraulically acting pressure control mechanism 140 of Fig. 1 which is omitted from the system according to Fig. 2 as may be observed in connection with modified time delay fluid control circumventing mechanism 135a. The special parts of mechanism 135a are identified by the same characters as those previously used, but primed.

With the modified arrangement just described, force of spring 160 on diaphragm 89 is removed when speed setting servo piston 21 moves to its shutdown-rod-lifting position through interaction of pin 155 and lever 156. Thereupon in absence of lubricating oil pressure the spring 107' which acts upon the lubricating oil pressure side of the diaphragm 89 returns the valve plunger 102 of valve 86 to its oil spilling position to vent operating fluid from unit 110.

As in the Fig. 1 arrangement the diaphragm spring 107' can be omitted, and controlled rate spilling of shutdown motive fluid through needle valve 113 substituted.

*Modified spurtwise fluid valving*

Fig. 2 (lower right) and complementary view Fig. 2a illustrate a modified speed setting servo pilot valve and fluid rate control mechanism 50a wherein spurtwise valving action for controlled rate movement of servo piston 21 and delayed shutdown action as already described are obtained principally by rotation of the pilot valve sleeve 51a with reference to port formations intersecting the bearing bore for the sleeve.

The governor pressure oil supply line portions 40 and 40a are shown as modified to the extent of being in non-intersecting relation to the bearing bore for sleeve 51a but connected thereto as by a passage 40b. The passage registers intermittently with one or more longitudinal grooves 98a in sleeve 51a (one groove shown) which in turn registers or register intermittently with a port portion 99b of line 99 for spurtwise control of governor oil in respect to shutdown motive unit 110. Radial ports 60a of the valve sleeve intersect the longitudinal groove 98a and are controlled by plain edge 57b of the upper valving land of pilot valve plunger 52a for supply of governor oil spurtwise to feed line 59 of the speed setting servo mechanism when said plunger is raised in calling for increased speed settings.

Radial spill ports 62a in the sleeve 51a (one shown), controlled by plain edge 58b of the valve plunger 52a, register intermittently with a cooperating sump-communicating port 62b for single step (controlled rate) decreased speed setting operation of the valve plunger, hence the speed setting servo. Farther, i. e. abnormal, downward movement of the valve plunger 52a (very small amount in actual practice) uncovers radial ports 62c of the sleeve 51a which constantly communicate with governor sump, through conventional passage means as illustrated, for high rate movement of the speed setting servo in the decreased speed setting direction and for shutdown.

*Pneumatic speed setting actuation*

Fig. 2 also illustrates diagrammatically the manner in which elastic fluid pressure for remote control of the speed setting servo mechanism can be used in place of solenoids. Unit 210 is an elastic diaphragm assembly similar to those used for engine lubricating system failure detection and with a pushrod 211 acting on the feedback lever 68 as at 214. Operating fluid is suitably introduced below the diaphragm 212 which has a return spring 213 opposing the action of the elastic fluid and which causes the feedback lever 68 to follow the pushrod 211.

*Load control; transition operation*

As shown by comparison of Figs. 1, 6, and 7 provision is made through a solenoid-actuated transition valve TV and transition piston T in connection with the load control valve mechanism 7 to render automatic adjustment of valve 7 by the governor power piston mechanism F through the tail rod 24 and its connecting linkage temporarily ineffective during changing of traction motor connections by the engineer or operator.

During such changing of locomotive traction motor connections, the generator excitation must be reduced to some low value in order to avoid arcing at the contact points. The operator's electrical control mechanism for effecting alteration of traction motor connections is arranged to energize the solenoid 170, Fig. 1 and operate transition mechanism T in a direction to cause the vane of the load control motor 1 through its valve 7 to move toward minimum excitation position. Reduced excitation means reduced engine load and as a result the governor power piston, to prevent overspeeding, moves to a low fuel position through action of the governor fly balls 34. Fuel decreasing motion of the governor power-piston-connected end of floating lever 14 would thereby, through normal operation of load control valve 7, result in the load control motor 1 moving toward maximum excitation. Thus when the new electrical connections are established the engine would be overloaded until a proper balance between generator excitation and engine speed had been established. To prevent such overloading normal load control action is made temporarily ineffective; and the vane motor 1 is caused to move toward minimum excitation concurrently with changes in the traction motor connections.

As shown, Fig. 1, transition valve mechanism TV has a plunger 171 connected with the solenoid armature and operating in a suitable ported sleeve 172 connected as by a line 173 to the governor accumulator system through pressure line 49a. Ports 174 of the valve are controlled by a downward movement of a valve plunger land 175 to divert pressure fluid as through line 176 to the working chamber of a piston 178 which is normally retained in non-working position by a suitable spring 180. The operating rod 181 of the transition piston 178, as shown particularly by Fig. 7, carries an arm 182 adapted ultimately to abut and raise a cross pin 183 on the stem portion 184 of the load control valve plunger 9 which, as shown, is coupled by a link 185, to the adjustable connection 15 of the floating lever 14.

When the solenoid 170 is energized by the operator's electrical controls governor pressure oil flows from the line 173 raising piston 178, as stated above; and when the solenoid 170 is de-energized a suitable return spring of the transition valve TV moves the solenoid armature and rod 171 to initial position meanwhile dumping the operating pressure for piston 178 through spill ports 186 leading to governor sump.

Referring particularly to Fig. 7 adjustable connection 16 is provided in order that when the governor power piston 23 is caused to move to its #1 (excitation) position by the speed setting servo mechanism S, the load control motor will be moved either to maximum or minimum generator excitation position as required by the type of locomotive service involved. Those two conditions are thus made available selectively during installation of subject system by the described adjustment since, in one case the load control valve plunger 9 will through port cracking by land 9a cause maximum excitation and in the other, through similar port cracking by land 9b, cause minimum excitation.

The governor power piston tail rod 24 has its upper end threaded at 190 to mate with threads of an adjustable sleeve 191 arranged to be moved up or down by sleeve portion 191' and locked in adjusted position as by nut 192. A tubular cross head 194 around the adjustable sleeve 191 is suitably maintained in axially adjusted position on said sleeve and the connection 16' between the floating lever 14 and tail rod 24 is represented as a pivot pin coupling the floating lever to the cross head 194.

*Balance point adjustment*

The adjustable connection 15 Fig. 7 between the floating lever 14 and the operating rod 184 of the load control valve is provided in order to allow an adjustable relationship between governor power piston travel and speed setting adjustment. Such adjustment requires shifting of the point of connection between the load control valve plunger 9 and the floating lever 14. Adjustable connection 15, in construction, is essentially the same as the excitation-adjustment between the tail rod 24 and floating lever 14, being a cross head 196 adjustable by a thread sleeve 197 along the floating lever and capable of being locked in position as by nut 198 after the proper balance point has been selected as determined by trial. Since adjustable connection 15 includes the link 185 it is usually necessary to perform adjustments 15 and 16 simultaneously because the link is effectively shortened as it is moved out of vertical position.

It will be seen from Fig. 7 that both the excitation adjustment and balance point adjustments are made easily available for manipulation through the top of the governor casing section 200 by removal of the cover 201.

I claim:

1. In and for an internal combustion engine having a pressure operated lubricating oil system, a hydraulic relay governor having a hydraulically operated speed setting servo mechanism including pilot valve means and a servomotor controlled thereby to adjust speed settings from low through a range of higher speeds, a hydraulically acting engine shutdown system including a shutdown motive unit, said speed setting servo pilot valve means operating through intermittently registering valve passages to maintain a low rate supply of operating fluid for the shutdown system whenever the servo is in low speed setting position, a valve mechanism connected for operation by the speed setting servomotor and operating whenever the servomotor is in higher than said low speed setting position to maintain a higher rate of supply of shutdown-system-operating fluid, a control valve in the shutdown system normally blocking admission of operating fluid at either rate to the shutdown motive unit, and a fluid pressure operable device sensitive to a predetermined pressure condition of the lubricating oil system, indicating failure thereof, for opening said control valve.

2. In and for an internal combustion engine having a pump operated lubricating oil system, a hydraulic relay governor for regulating the engine fuel input, an engine shutdown system including a hydraulic motive unit operative to adjust the governor to block fuel input to the engine, means operative to maintain a source of pressure fluid for operation of said motive unit, a control valve in said system normally blocking admission of operating fluid to said motive unit, a pair of fluid pressure operable devices, each mechanically connected to said control valve to admit operating fluid to said motive unit, one of said devices being arranged for operation by failure of the oil pump to maintain predetermined lubricating oil pressure, the other being arranged for operation by excessive oil pump suction.

3. In and for an internal combustion engine having a lubricating oil pressure maintaining system the pressure of which varies with engine speed, a hydraulic relay speed governor for the engine, a speed setting servo mechanism for the governor including a servomotor element arranged to adjust the engine speed through the intermediary of the governor from low through a range of speed settings, means to cause shutdown of the engine through the intermediary of the governor, pressure-sensitive means adapted for connection with the lubricating system and operable in response to an undesirably low pressure condition thereof to initiate operation of the engine shutdown means, and a device connected for operation by the speed setting servomotor element and acting to oppose said operation of the pressure-sensitive means with a force which increases solely as a function of speed setting servomotor element position from low toward high speed settings.

4. In or for an internal combustion engine having a lubricating oil pressure maintaining system the pressure of which varies with engine speed, a hydraulic relay speed governor for the engine, a speed setting servo mechanism for the governor including a servomotor element arranged to adjust the engine speed through the intermediary of the governor from low through a range of speed settings, means to cause shutdown of the engine through the intermediary of the governor, pressure-sensitive means adapted for connection with the lubricating system and operable in response to an undesirably low pressure condition thereof to initiate operation of the engine shutdown means, a spring arranged to oppose the action of lubricating oil pressure on said means, and a device operatingly connecting the speed setting servomotor element to said spring and operating to increase the effective force of the spring as a function of increased speed setting positions of the servomotor element.

5. In combination with a hydraulic relay engine governor having a speed conscious pilot-valve-operating mechanism and power piston actuated thereby for engine fuel adjustment and fluid operated servo system with its servomotor acting on the speed conscious mechanism for engine speed adjustment, a source of fluid pressure for said speed setting servo system, the relay valve of the system being subject to rapid adjustment, means embodied in the relay valve normally to cause spurtwise controlled rate fluid movement in respect to the speed setting servomotor, engine shutdown means actuated by the speed setting servo motor in one direction of its operation, and a device acting on the relay valve in a manner to overcome its spurtwise fluid controlling action whereby to cause rapid rate fluid movement therethrough for the shutdown actuating operation of the speed setting servomotor.

6. In combination with an internal combustion engine fuel regulating hydraulic relay governor mechanism for engine-generator locomotive service, a fluid operated speed setting servo mechanism having a servomotor operating on a speed sensing means of the governor mechanism and a pilot valve including a ported sleeve and plunger with fluid connections to the servomotor, signal operated rapid-motion means to relatively adjust the sleeve and plunger axially for causing speed setting movements of the servomotor from low speed through a desired operating range, said sleeve being continually rotated, porting means rendered operative by said rotation for effecting spurtwise flow and controlled rate operation of the servomotor in two directions, fluid operated engine shutdown means in the governor mechanism and acting therethrough to stop the engine, porting means rendered operative by said rotation to supply fluid spurtwise for operating the engine shutdown means, pressure sensitive means responsive to an undesired condition of the engine and including a valve normally blocking the supply of spurtwise fluid to the engine shutdown means, fluid connections between said porting means and valve last identified for circumventing or by-passing the spurtwise fluid as supplied to said valve, a circumventing valve in said connections and means connecting the same to the speed setting servomotor so that the circumventing valve is opened whenever said servomotor is in a higher than said low speed position.

7. In an internal combustion engine governor mechanism for engine generator locomotive service, a hydraulic relay speed governing unit having fuel regulating means and speed conscious mechanism including a relay valve actuating said means, a hydraulic speed setting servo mechanism adapted for rapid action through remote control and operating on the speed conscious mechanism, hydraulic shutdown means, a pilot valve for the speed setting servo mechanism having continually relatively rotating telescoping parts including a plunger and sleeve which are relatively movable axially to normal positions for controlling the speed setting operation and similarly to a wholly abnormal position and in that case being operative to actuate the shutdown means, a shutdown motive unit for operating the pilot valve plunger to its abnormal position, fluid control spurt determining ports in two of said relatively rotating valve parts for supplying fluid at a controlled rate for delayed operation of the shutdown motive unit when the speed setting servo mechanism is in a low speed setting position, a valve blocking admission of such controlled rate fluid to said motive unit, valve means controlled by the speed setting servo mechanism when in higher speed setting positions to circumvent the controlled rate fluid supply to the blocking valve, and means responsive to an undesired condition of the governed engine and arranged for opening said blocking valve when such condition obtains.

8. In and for a hydraulic relay governor in fuel regulating relationship to an internal combustion engine, said governor having a speed setting means and hydraulically acting engine shutdown mechanism, a speed setting fluid operated servo system including a speed setting servomotor acting on the governor speed setting means and a pilot valve for controlling the servomotor, means for effecting predetermined valving movements of the pilot valve in opposite directions for speed setting, valve means operated by the pilot valve when the latter is moved additionally in one direction beyond such predetermined movement for actuating the shutdown mechanism, a fluid actuated shutdown motive unit having an operating part arranged additionaly to move the pilot valve as stated, a valve system operable to supply said motive unit with operating fluid at a controlled rate, valve mechanism in said system and operating means therefor responsive to an undesired condition of the governed engine, said valve mechanism rendering the system operative to apply the controlled rate fluid to said motive unit, and latching means acting on said operating part of the motive unit to retain said pilot valve in shutdown actuating position.

LLOYD JACKSON MOULTON.

References Cited in the file of this patent

UNITED STATES PATENTS

| Number | Name | Date |
|---|---|---|
| 1,967,851 | Wilson | July 24, 1934 |
| 2,344,308 | Kalin | Mar. 14, 1944 |
| 2,542,765 | Gillespie | Feb. 20, 1951 |

FOREIGN PATENTS

| Number | Country | Date |
|---|---|---|
| 233,432 | Great Britain | May 8, 1925 |